United States Patent

Schoeck

[11] 3,890,125
[45] June 17, 1975

[54] FILTER BAG

[75] Inventor: Vincent E. Schoeck, Hagerstown, Md.

[73] Assignee: The Carborundum Company, Niagara Falls, N.Y.

[22] Filed: Apr. 1, 1974

[21] Appl. No.: 457,020

Related U.S. Application Data

[63] Continuation of Ser. No. 182,974, Sept. 23, 1971, abandoned.

[52] U.S. Cl. .............. 55/381; 55/528; 156/304; 156/306
[51] Int. Cl. ............................................ B01d 46/02
[58] Field of Search ...... 55/341, 381, 382; 156/306, 156/304

[56] References Cited
UNITED STATES PATENTS

| | | | |
|---|---|---|---|
| 2,719,100 | 9/1955 | Banigan | 156/306 |
| 2,941,577 | 6/1960 | Roseman | 156/304 |
| 3,273,321 | 9/1966 | Bauder et al. | 55/341 |

OTHER PUBLICATIONS

Dust. Collector Bulletin 311, Dustex Division of American Precision Ind. Inc., pg. 1–8 dtd. 12/68.

*Primary Examiner*—Bernard Nozick
*Attorney, Agent, or Firm*—David E. Dougherty; William H. Holt

[57] ABSTRACT

A filter bag of thermoplastic material for filtering solids from gases has a longitudinal joint formed by fusing together overlapping edge portions of the material so as to form a tubular body. In an apparatus for forming the filter bag, a heating element which is shaped like a blade heats the thermoplastic material to at least the softening point and a pair of opposing rollers are adapted to compress the heated material so as to form the fused seam.

4 Claims, 4 Drawing Figures

PATENTED JUN 17 1975　　3,890,12[?]
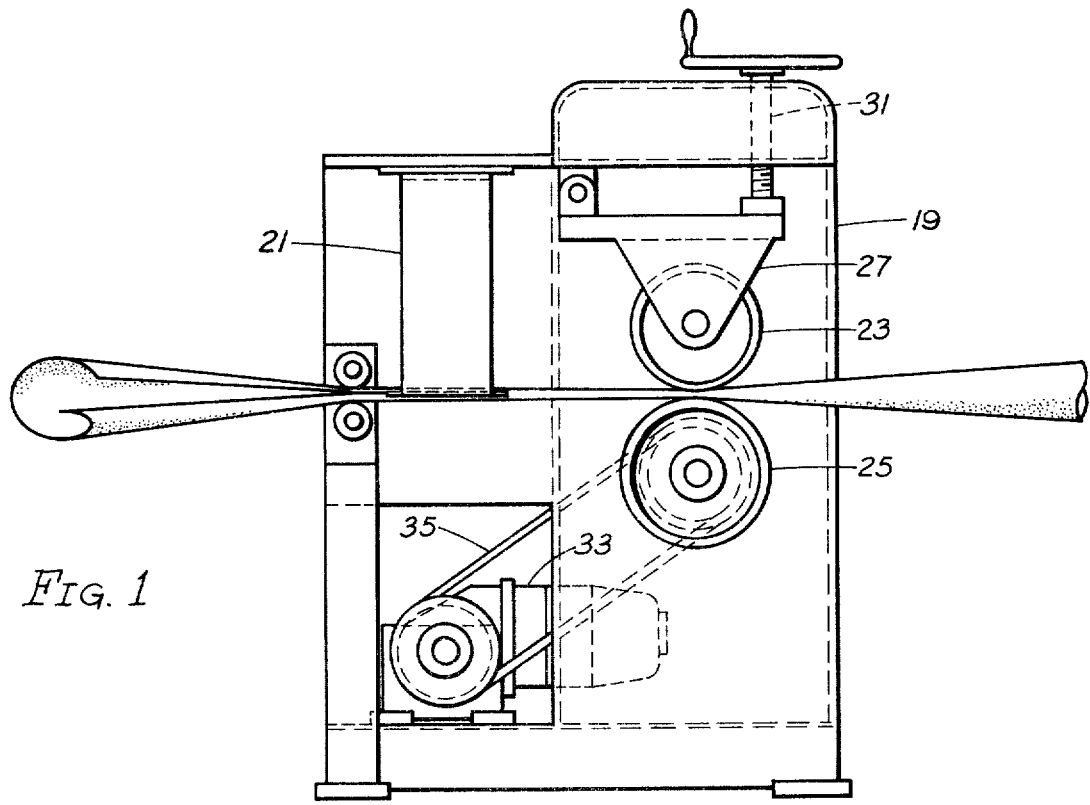
Fig. 1
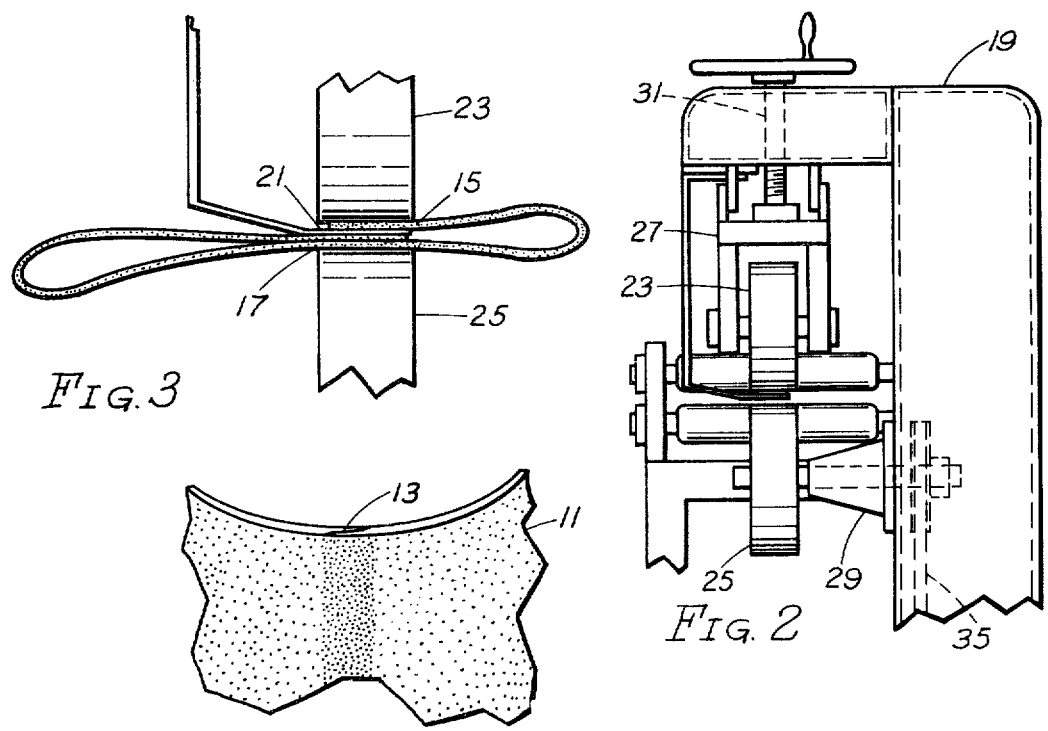
Fig. 3
Fig. 2
Fig. 4

FILTER BAG

This is a continuation of copending application Ser. No. 182,974, filed Sept. 23, 1971, now abandoned.

BACKGROUND OF THE INVENTION

This invention relates to an improved filter bag or tube and process and apparatus for forming the bag or tube.

The recovery of solids from a suspension of finely divided solids and gases is conventionally effected in a bag filter. The gaseous suspension is passed through an upright porous bag leaving a portion of the finely divided solids on the walls of the bags. The bags are flexed causing a portion of the solids to fall into a subadjacent collecting zone. The bags are made of woven material which withstand the conditions required by the specific application.

The bags are commonly fabricated from a length of flexible flat woven cloth which is provided with a narrow selvage at opposite sides thereof. The selvages are typically joined by folding one side edge over upon itself and folding an opposite side edge over upon itself with the latter fold being formed completely within the first fold so as to form an interlocking and overlapping joint. The joint is typically stitched together with a plurality of vertical stitches within the width of the folded seam.

In sewing the above-mentioned bags of the prior art, the seam is placed under tension so that the proper interlocking configuration is maintained. This tension is often sewn into the bag so that the longitudinal seam is longer than the opposite portion of the bag resulting in a banana-shaped filter bag.

During filtering operations employing stitched seam bags of the prior art, it has been observed that the repeated flexing of bags can cause a breakage in the stitching in the sewn seam long before the useful life of filter is expended. The severing of one thread which is exposed to the debris in a sewn bag will result in the unraveling of the thread with the resulting failure of the bag and decrease in efficiency of the filtering operation.

Furthermore, as sewn bags of the prior art flex due to the reverse flow of gas, the material around the stitches tends to pull apart leaving openings adjacent the stitching which are bigger than the pores of the bag. Therefore, the ability of the bag to filter a given size particle is decreased.

Due to the multiple layers of cloth at the seam in a conventionally formed filter bag, there is little or no filtration at the seam. Since sewn means must be quite wide to accommodate the folds of material, there is considerable loss of filter area at the seam.

SUMMARY OF THE INVENTION

In the present invention, a tubular body of a thermoplastic material has a longitudinal joint formed by fusing together overlapping portions of the material. The fusing process is performed by overlapping edge portions of a length of the thermoplastic filter material heating at leat one of the overlapping edge portions to a temperature above the softening point, and compressing the overlapping portions of the material together so as to form a fused seam. The apparatus for forming the fused seam includes a blade-shaped heating element for contacting an edge portion of the thermoplastic material and a pair of opposing rollers for compressing overlapping portions of material. The rollers are positioned sufficiently close to the heating element so as to fuse the overlapping portions of material together.

Since the fused seam of the present invention is not formed under tension, banana-shaped tubes are not formed. Furthermore, the overlapping of material at the seam can be considerably reduced with a resulting increase in filter area. With the elimination of threads the longevity of the filter bags are increased and needle holes which decrease the efficiency of filtration are eliminated. The overlapping fused seam which can be formed with only two thicknesses of material is more flexible than the conventional sewn seam which is formed from four thicknesses of material. The improved flexing during cleaning aids the filter operation. The fused seam of the present invention obviates many of the deficiencies found in filter bags of the prior art.

BRIEF DESCRIPTION OF THE DRAWINGS

The drawings which illustrate a preferred embodiment of the present invention are as follows:

FIG. 1 is a side elevational view of the apparatus of the present invention which forms a fused seam;

FIG. 2 is an end elevational view of the apparatus of FIG. 1;

FIG. 3 is a detailed end elevational view of the apparatus of FIG. 1; and

FIG. 4 is a detailed view of a portion of a filter bag with a fused seam.

DETAILED DESCRIPTION OF A PREFERRED EMBODIMENT

According to the principles of the present invention, the filter bag 11 for filtering solids from gases is a tubular body of a thermoplastic material with a longitudinal seam or joint 13 formed by fusing together overlapping edge portions 15 and 17 of the thermoplastic material.

The thermoplastic material preferably has a melting point greater than about 150° Centigrade so that the strength of the seam is maintained under various conditions of operation. The thermoplastic material can be a variety of woven or felted materials. Preferably the fibers forming the material are polyamide fibers, polyester fibers, olefin polymer fibers or mixtures thereof. Typical polyamides or nylons which can be used contain reoccurring amide groups as an integral part of the main polymer chain. Linear polyamides formed as products of condensation of bifunctional monomers, such as amino acids or condensation of diamines and dibasic acids can be used. Copolymers comprising combinations of diacids, diamines and amino acids can also be effectively used to form the fiber material. In fibers formed from polyesters, a long chain polymer which comprises an ester of a dihydric alcohol and a terephthalic acid has a plurality of carboxylate ester groups forming components of the structure. Fabrics formed from various olefin polymers such as polypropylene are suitable for lower temperature applications. To impart a higher melting point, the olefin polymers can be steric specific or blended with various elastomers.

According to the process of the present invention, overlapping edge portions 15 and 17 of a length of thermoplastic filter material are joined together by heating at least one of the overlapping portions 15 to a temperature above the softening point and compressing the overlapping portions 15 and 17 of the material together so as to form a fused seam 13.

As illustrated in FIG. 1, the apparatus for forming the fused seam 13 includes a frame 19 resting on the ground or other suitable support. The frame 19 has depending therefrom a heating element 21. The heating element 21 is a thin elongated blade-like element which presents a flat horizontal surface for receiving a thermoplastic fabric. The heating element 21 is connected to a source of electricity (not shown) and has suitable control means (not shown) connected therewith for maintaining a predetermined temperature.

A pair of rollers 23 and 25 are spaced sufficiently close to the heating element 21 so that the softened or melted fabric does not solidify prior to contacting the rollers 23 and 25. The space between the rollers 23 and 25 is aligned with the heating element 21 in a substantially level plane. The rollers 23 and 25 are attached to the frame 19, yoke member 27 and support member 29, respectively. The yoke member 27 can be adjusted vertically by means of a jackscrew 31, or any conventional means for adjusting the distance between the rollers 23 and 25. This adjustment changes the compression on seam 13 after the material is heated by the heating element 21. Preferably the distance between the rollers 23 and 25 is about the width of one thickness of thermosetting material. As illustrated in the drawings, at least one roller 25 is driven by motor 33 through a suitable drive 35. Preferably a control means (not shown) is included for maintaining the rotation at a predetermined speed.

In FIG. 3, a thermoplastic material is illustrated in detail passing through the heating element 21 and between the rollers 23 and 25. An edge portion 15 of the thermoplastic material passes over and contacts the upper surface of the heating element 21 so that the edge portion 15 is softened sufficiently to fuse with another edge portion 17 which passes underneath the heating element 21. Preferably the heating element 21 is maintained at a temperature higher than the melting point of the thermoplastic material so as to obtain a fused seam 13. The edge portion 15 and the edge portion 17 are fed from the heating element 21 in overlapping relationship so that the edge portion 15 is positioned directly above the edge portion 17 as the material is fed into the rollers 23 and 25. As illustrated in FIG. 3, three thicknesses of material are passed between the rollers 23 and 25 including the side of the bag 11 opposite the fused seam 13. The bottom side of the edge portion 17 is maintained at a sufficient temperature so that fusion does not occur between the edge portion 17 and the opposite side of the bag 11.

For a particular thermoplastic material, the temperature of the heating element 21, the speed of material being fed to the heating element 21 and through the rollers 23 and 25, and the pressure or spacing of the rollers 23 and 25 are important variables. The exact arrangement used varies from material to material. Generally, it is preferred to maintain the temperature of the heating element 21 above the melting point of thermoplastic material. In this case, the material is fed over the heating element 21 at a rate so that the top layer or portion of material 15 becomes soft and fusible but does not melt sufficiently to stick to the blade. In this case, the rollers 23 and 25 are adjusted to about the thickness of one layer of material and placed in close proximity to the heating element 21 so that the top layer of material 15 is fused into the bottom overlapping portion 17 prior to solidification.

A preferred embodiment of the present invention having been described herein, it is recognized that modifications, variations, and changes therein will be apparent to one of ordinary skill in the art. It is contemplated that the claims appended herewith will cover such modifications, variations and changes that are within the broad spirit and scope of the present invention.

What is claimed is:

1. A filter bag for filtering solids from gases, said filter bag comprising a sheet of fabric of porous thermoplastic material having opposite edge portions of said fabric overlapped and joined together in a fused joint and defining a tubular body, said joint extending longitudinally along said tubular body, and said joint having essentially the same thickness as that of said sheet of fabric.

2. A filter bag according to claim 1 wherein said thermoplastic material is selected from the group consisting of polyamide fibers, polyester fibers, olefin polymer fibers and mixtures thereof.

3. A filter bag according to claim 1 wherein said fused joint is less than ½ inch in width.

4. A filter bag according to claim 3 wherein said joint has a width between ⅛ inch and ½ inch.

* * * * *